(12) United States Patent
Murai

(10) Patent No.: US 8,232,964 B2
(45) Date of Patent: Jul. 31, 2012

(54) APPARATUS FOR OPERATING OBJECTS AND A METHOD FOR IDENTIFYING MARKERS FROM DIGITAL IMAGE FRAME DATA

(75) Inventor: Yukiro Murai, Nara (JP)

(73) Assignee: Jun Maeda, Nara (JP)

( * ) Notice: Subject to any disclaimer, the term of this patent is extended or adjusted under 35 U.S.C. 154(b) by 948 days.

(21) Appl. No.: 12/285,937

(22) Filed: Oct. 16, 2008

(65) Prior Publication Data

US 2009/0122010 A1 May 14, 2009

(30) Foreign Application Priority Data

Oct. 18, 2007 (JP) ................. 2007-271491

(51) Int. Cl.
*G06F 3/033* (2006.01)
*G06F 3/042* (2006.01)
*G09F 5/08* (2006.01)

(52) U.S. Cl. ............ 345/158; 178/18.09; 345/166; 345/175

(58) Field of Classification Search ............... None
See application file for complete search history.

(56) References Cited

U.S. PATENT DOCUMENTS

| 6,128,003 | A * | 10/2000 | Smith et al. | 345/157 |
|---|---|---|---|---|
| 6,160,923 | A * | 12/2000 | Lawton et al. | 382/275 |
| 6,421,042 | B1 | 7/2002 | Omura et al. | |
| 6,429,856 | B1 | 8/2002 | Omura et al. | |
| 7,443,387 | B2 * | 10/2008 | Tanaka et al. | 345/173 |
| 7,538,894 | B2 * | 5/2009 | Kobayashi | 356/614 |
| 2008/0297512 | A1 * | 12/2008 | Sanchez | 345/440 |
| 2009/0027337 | A1 * | 1/2009 | Hildreth | 345/158 |

FOREIGN PATENT DOCUMENTS

| JP | 2000-105671 | 4/2000 |
|---|---|---|
| JP | 2000-132340 | 5/2000 |
| JP | 2004-38429 | 2/2004 |
| JP | 2004-78488 | 3/2004 |
| JP | 2005-301693 | 10/2005 |
| JP | 2006-277666 | 10/2006 |

* cited by examiner

*Primary Examiner* — Daniell L Negron
(74) *Attorney, Agent, or Firm* — Wenderoth Lind & Ponack, L.L.P.

(57) ABSTRACT

An input apparatus other than a mouse supports an input to a computer by fingers or by mouth. The input apparatus operates an object on a screen based on an imaged operating element. The input apparatus includes a computing apparatus; a display apparatus connected to the computing apparatus; and an imaging apparatus connected to the computing apparatus. The imaging apparatus images a predetermined operating element. The computing apparatus displays, as a marker, an image of the imaged operating element on the display apparatus. The object on the screen of the display apparatus is operated by movement of the marker.

12 Claims, 13 Drawing Sheets

Fig.2
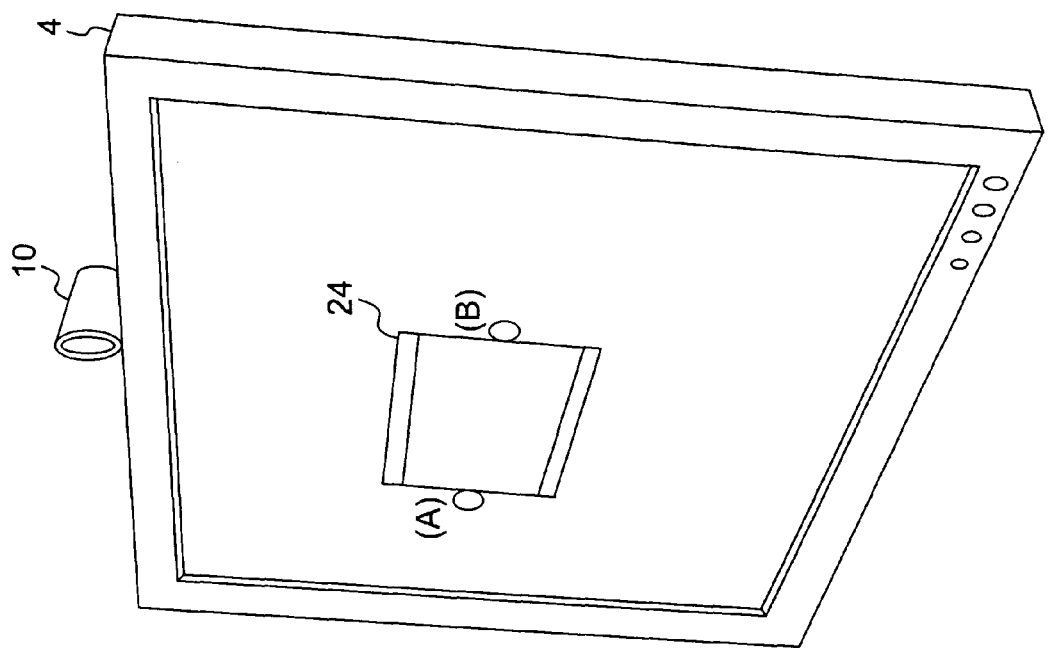
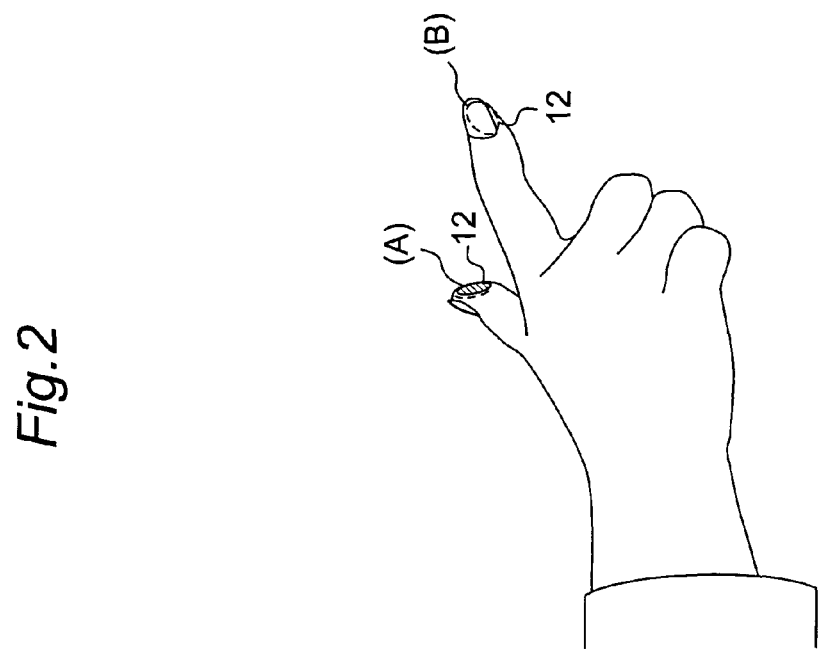

Fig.6
(1)
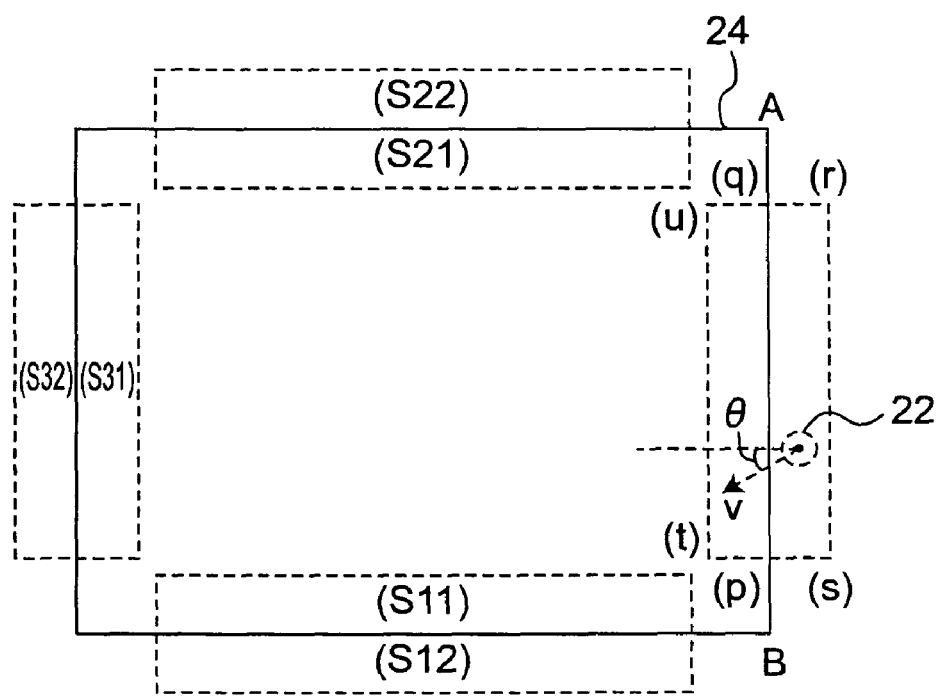
(2)
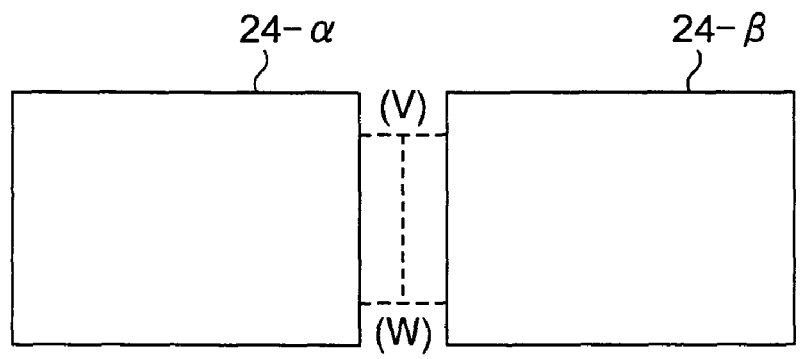

Fig.8

S0802
REMOVE MATTER ELEMENT WITH LARGE OR SMALL AREA

S0804
REMOVE MATTER ELEMENT WITH LOW PRECISE CIRCLE RATE

S0806
REMOVE BEADED NOISE

S0808
CONNECT MATTER ELEMENT TO ITS IDENTICAL MATTER ELEMENT ON IMMEDIATELY PRECEDING FRAME

S0810
CALCULATE VELOCITY VECTOR OF MATTER ELEMENT

Fig.9
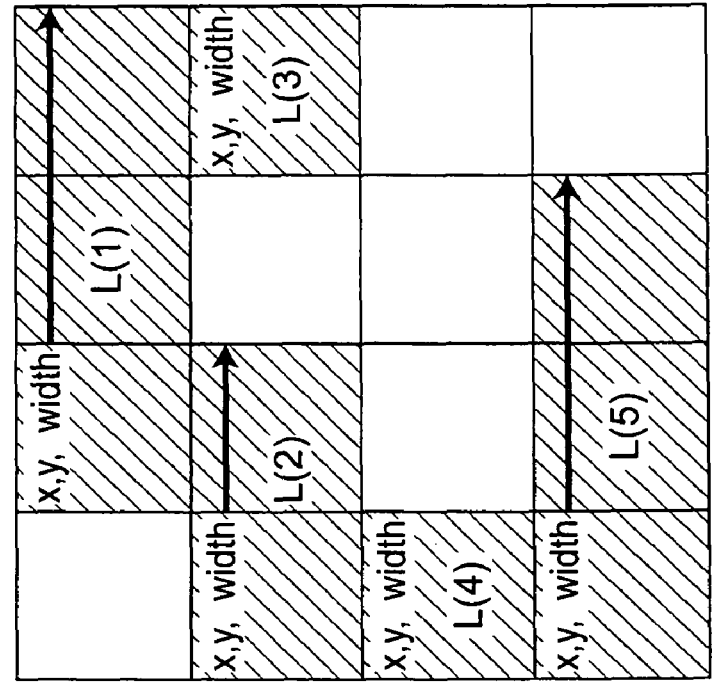
(1)
NUMBER OF DATA : 30 INTEGERS
LABELING PROCESS
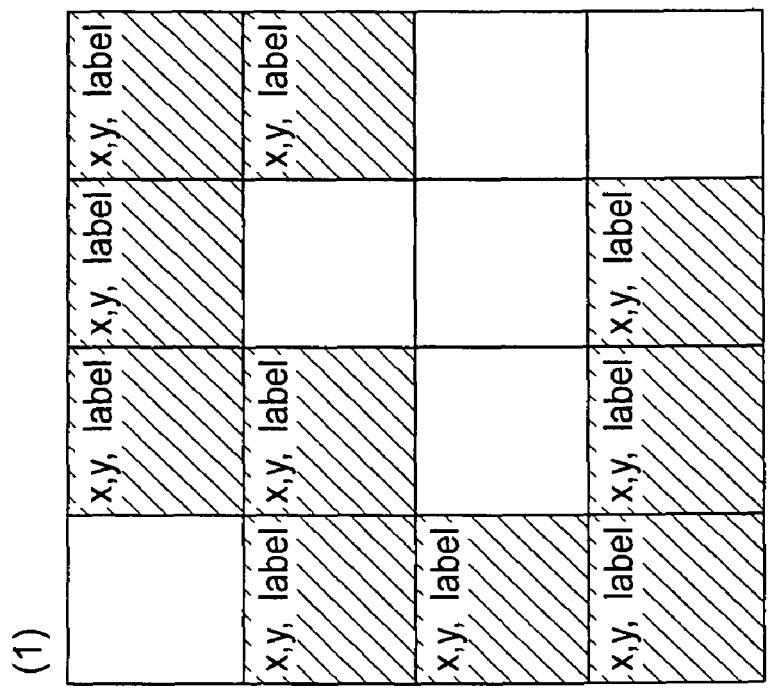
(2)
NUMBER OF DATA : 15 INTEGERS
ELEMENT ORIENTATION

Fig. 11

| NOTATION OF MATHEMATICAL OPERATIONS | |
|---|---|
| | SUM : A+B<br>DIFFERENCE : A−B<br>MULTIPLICATION OF REAL NUMBERS : A×B<br>INNER PRODUCT OF VECTORS : A · B<br>FUNCTION : f(x, y, ...)<br>COMPONENT OF VECTOR v : v.x, v.y |
| NOTATION OF MARKER | |
| | ONE MARKER: m=(a,s,v) (a: ONE MATTER ELEMEN, s: POSITIVE INTEGER, v: VELOCITY VECTOR ON XY PLANE)<br>nTH MARKER: Mn=(a,s,v)<br>SEQUENCE OF n MARKERS: {Mn}<br>FIELD OBTAINING OF MARKER: m→a, m→s, m→v OR Mn→a, Mn→s, Mn→n<br>FIELD OBTAINING OVER A PLURALITY OF LEVELS: Mp→a→Lq→x, etc. |
| NOTATION OF RECEIVER | |
| | ONE RECEIVER: r=(x,y,w,h,p) ( x, y, w, h: RANGE OF WINDOW, p: IMMEDIATELY PRECEDING TEMPLATE)<br>nTH RECEIVER: Rn(x,y,w,h,p)<br>SEQUENCE OF n RECEIVERS: {Rn}<br>FIELD OBTAINING OF RECEIVER: r→x, r→y, r→w, r→h, r→p OR Rn→x, Rn→y, Rn→w, Rn→h, Rn→p |
| NOTATION OF TEMPLATE | |
| | ONE TEMPLATE: t=(d,Q(r,m)) (d: ORDER, Q(): FUNCTION THAT TAKES ONE RECEIVER AND SEQUENCE OF MARKERS AS ARGUMENTS, r: ONE RECEIVER WHICH IS ARGUMENT, m: SEQUENCE OF MARKERS WHICH IS ARGUMENT)<br>nTH TEMPLATE: Tn=(d,Q(r,m))<br>SEQUENCE OF n TEMPLATES: {Tn}<br>FIELD OBTAINING OF TEMPLATE: t→d OR Tn→x<br>EXECUTION OF FUNCTION OF TEMPLATE: t→Q(Rp,{Mp}) OR Tn→Q(Rp, {Mp}) |
| NOTATION OF OPERATION | |
| | ONE OPERATION : o = (O(r, m)) : FUNCTION THAT TAKES ONE RECEIVER AND SEQUENCE OF MARKERS AS ARGUMENTS AND BY EXECUTING THE FUNCTION THE RECEIVER IS DEFORMED, r: ONE RECEIVER WHICH IS ARGUMENT, m: SEQUENCE OF MARKERS WHICH IS ARGUMENT)<br>nTH OPERATION: On=(o(r,m))<br>SEQUENCE OF n OPERATIONS: {On}<br>EXECUTION OF FUNCTION OF OPERATION: o→O(Rp,{Mp}) OR On→O(Rp,{Mp}) |

Fig. 12

| NOTATION OF MATHEMATICAL OPERATIONS | |
|---|---|
| | SUM : A+B |
| | DIFFERENCE : A-B |
| | MULTIPLICATION OF REAL NUMBERS : A×B |
| | INNER PRODUCT OF VECTORS : A · B |
| | FUNCTION : f(x, y, ...) |
| | TOPOLOGICAL GRAPH : G := {g, V, E} (V AND E MAY BE EITHER SEQUENCE OR SET) |
| NOTATION OF ELEMENT | |
| | ONE SEGMENT ELEMENT: l=(x,y,w) |
| | nTH SEGMENT ELEMENT: Ln=(x,y,w) |
| | SEQUENCE OF n SEGMENT ELEMENTS: {Ln} |
| | FIELD OBTAINING OF SEGMENT ELEMENT: l→x, l→y, l→w OR Ln→x, Ln→y, Ln→w |
| | ONE MATTER ELEMENT: a={Ln} |
| | nTH MATTER ELEMENT: An={Ln} |
| | SEQUENCE OF n MATTER ELEMENTS : {An} |
| | FIELD OBTAINING OF MATTER ELEMENT : a→{Ln} (OBTAIN ALL COMPOSING SEGMENT ELEMENTS), a→Ln (OBTAIN nTH COMPOSING SEGMENT ELEMENT) OR An→{Ln}, An→Ln |
| | FIELD OBTAINING OVER A PLURALITY OF LEVELS: Ap→Lq→x, etc. |
| OMISSION METHOD FOR MATHEMATICAL OPERATIONS IN ELEMENT | |
| | FOR FIELD VALUE OPERATION IN THE SAME ELEMENT, Ln→x + Ln→w CAN BE OMITTED AS Ln→(x+w). THE OMISSION METHOD IS ALSO APPLICABLE TO OPERATORS OTHER THAN +. FIELD VALUE OPERATION BETWEEN DIFFERENT ELEMENTS CANNOT BE OMITTED. |

APPARATUS FOR OPERATING OBJECTS AND A METHOD FOR IDENTIFYING MARKERS FROM DIGITAL IMAGE FRAME DATA

BACKGROUND OF THE INVENTION

1. Field of the Invention

The present invention relates to an apparatus for operating objects on a computer and a method for identifying markers from digital image frame data.

2. Related Art

As input devices that support computer GUIs, currently, mice are widely used. However, mice are not always useful input devices for people with disorders of the hand or arm, for example.

On a computer image, a mouse always performs an input operation for one point. However, an input device that simultaneously performs an input operation on a computer image through a plurality of points cannot be found at present. That is, it can be said that input devices that support an operation in which a computer operator approaches an object on a screen by a plurality of fingers of his/hers have not been developed nearly at all.

In addition, the following are some examples of the prior art related to the present invention but none of them disclose an input device that supports an operation in which a computer operator approaches an object on a screen by a plurality of fingers of his/hers.

[Patent Document 1] Japanese Patent Application Laid-Open No. 2006-277666

[Patent Document 2] Japanese Patent Application Laid-Open No. 2005-301693

[Patent Document 3] Japanese Patent Application Laid-Open No. 2004-078488

[Patent Document 4] Japanese Patent Application Laid-Open No. 2004-038429

[Patent Document 5] Japanese Patent Application Laid-Open No. 2000-132340

[Patent Document 6] Japanese Patent Application Laid-Open No. 2000-105671

SUMMARY OF THE INVENTION

An object of the present invention is to provide an input apparatus other than mice that supports an input to a computer by fingers or a mouth.

The present invention is made to attain the above-described object. An apparatus for operating objects according to the present invention is directed to:

an apparatus for operating objects that operates an object on a screen based on an imaged operating element, the apparatus including:

a computing apparatus;

a display apparatus connected to the computing apparatus; and an imaging apparatus connected to the computing apparatus, wherein the imaging apparatus images a predetermined operating element and the computing apparatus displays, as a marker, an image of the imaged operating element on the display apparatus, and the object on the screen of the display apparatus is operated by movement of the marker.

A method for identifying markers from digital image frame data, according to the present invention includes the steps of:

generating a bitmap $B(x, y)$ in a pixel unit, focusing on a predetermined color, using digital image frame data;

representing presence of a bit at each y (vertical axis) value by a segment element $(x, y, w)$ having a starting point $(x)$ and a width $(w)$;

determining whether there is a contact relationship between the segment elements and putting together segment elements having a contact relationship into a matter element; and removing noise from matter elements.

By using the present invention, an input operation on a computer can be directly performed by a relative operation by fingers, a mouth, etc., performed on a display screen.

BRIEF DESCRIPTION OF DRAWINGS

FIG. 2 is a diagram showing a relationship between stickers and markers in the apparatus for operating objects according to the present invention;

FIG. 6 is a diagram for describing an action performed on a side of a window by a marker;

FIG. 8 is a detailed flowchart of a "noise removal" step (S08) in the flowchart shown in FIG. 7;

FIG. 9 is a conceptual diagram showing the contrast between a conventional-art labeling process and element orientation;

FIG. 11 is a list showing notation of a marker, a receiver, a template, and an operation in the present specification;

FIG. 12 is a list showing element orientation notation in the present specification.

DETAILED DESCRIPTION OF THE INVENTION

A preferred embodiment of the present invention will be described below with reference to the drawings.

Figure 1:
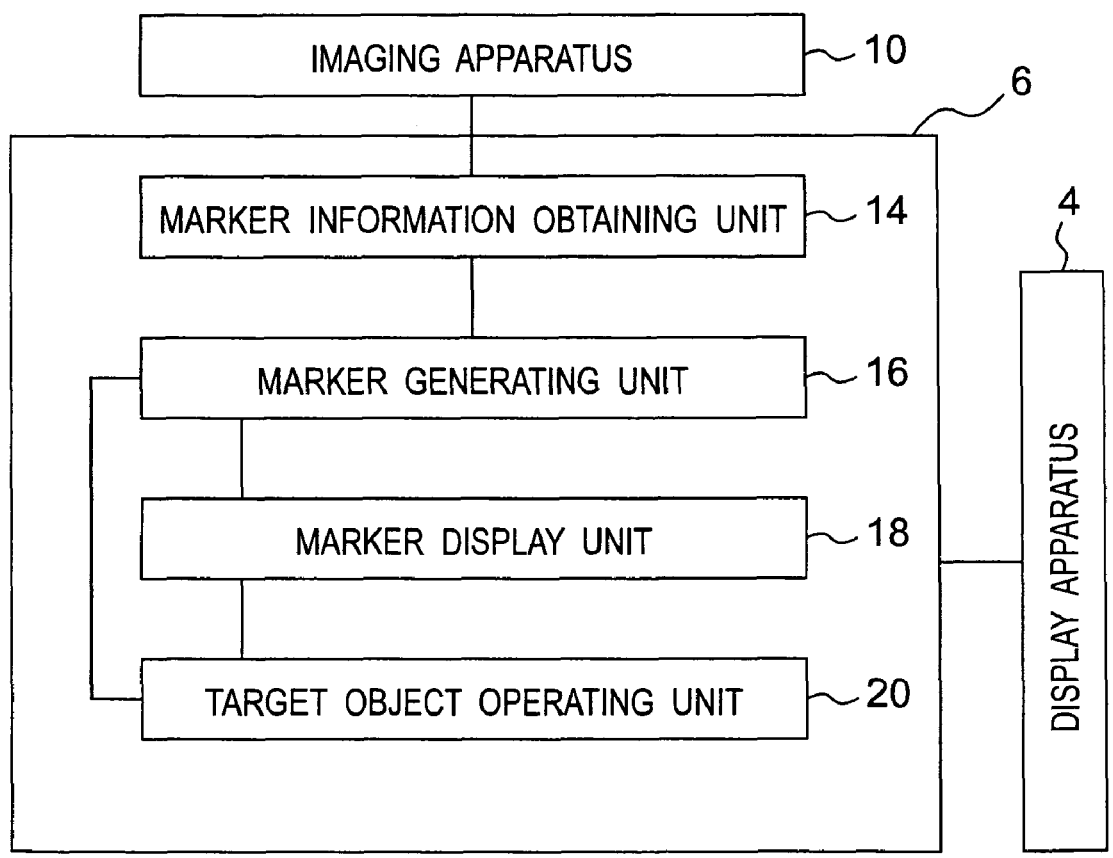
FIG. 1 is a block diagram showing schematic functions of an apparatus for operating objects according to the present invention.

FIG. 1 is a block diagram showing schematic functions of an apparatus 2 for operating objects according to an embodiment of the present invention. As also shown in FIG. 2, the apparatus 2 for operating objects according to the present invention is composed of a computer 8 including a display apparatus 4 and a computing apparatus 6; a digital imaging apparatus (DV camera) 10 connected to the computer 8; and stickers 12. A marker information obtaining unit 14, a marker generating unit 16, a marker display unit 18, and a target object operating unit 20 which are respective function units of the computing apparatus 6 are implemented by a CPU executing appropriate computer programs. The digital imaging apparatus (DV camera) 10 may be installed at an upper end of the display apparatus 4 of the computer 8 (see FIG. 2).

Figure 3:
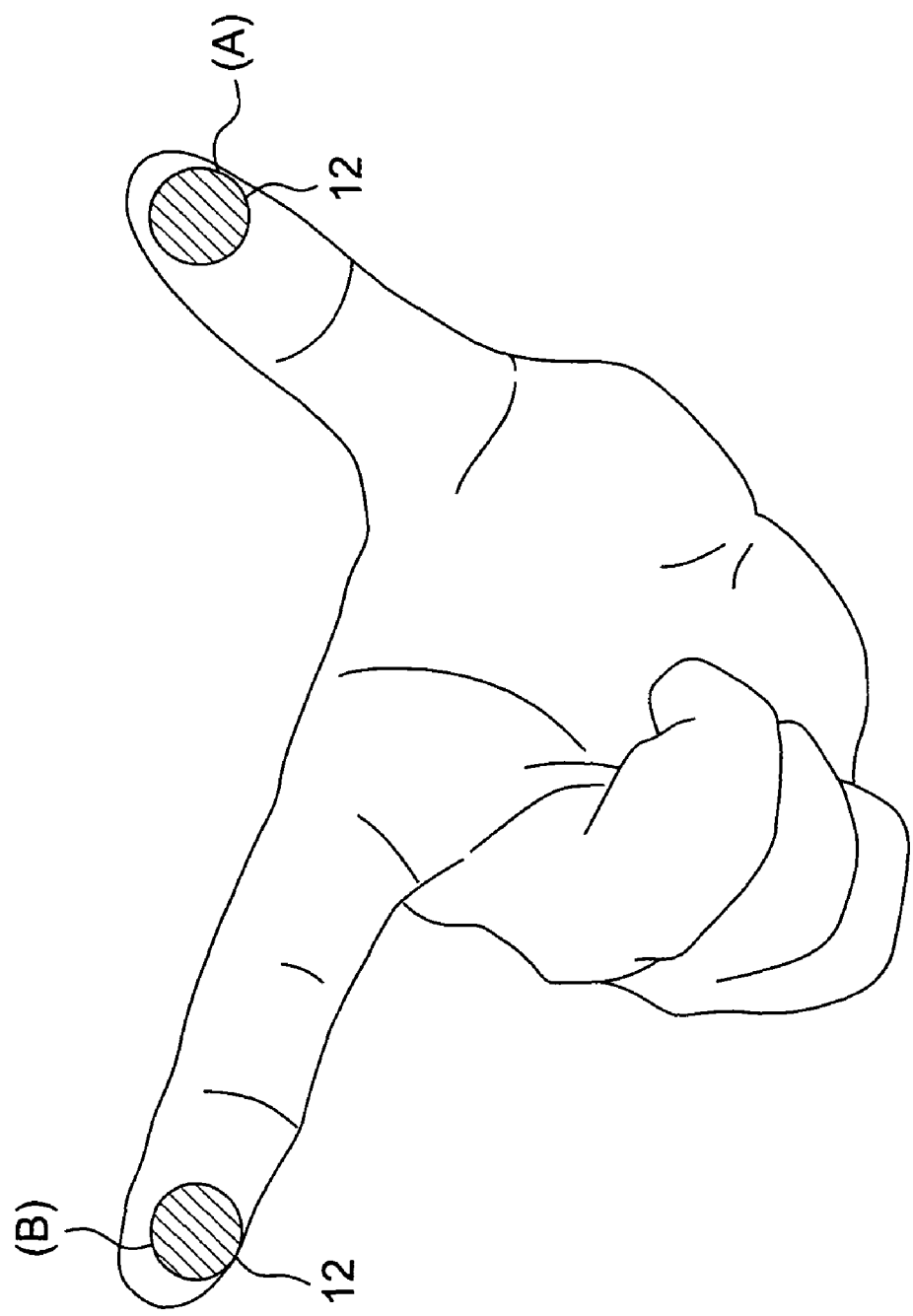
FIG. 3 is a diagram showing a state in which stickers are attached to fingers.

The digital imaging apparatus (DV camera) 10 images the stickers 12 attached to fingers and serving as operating elements, such as those shown in FIG. 3, and the surroundings and background thereof. Although in FIG. 3 two stickers 12 are respectively attached to a tip of a thumb and a tip of an index finger, the stickers 12 may be attached to tips of other fingers. Alternatively, instead of fingers, the stickers 12 may be attached to a palm or the like.

In addition, the digital imaging apparatus (DV camera) 10 generates image data in a frame format every very short unit time (e.g., 1/60 second). Thus, the marker information obtaining unit 14, the marker generating unit 16, the marker display unit 18, and the target object operating unit 20 which are included in the apparatus 2 for operating objects process image data in a frame unit.

The stickers 12 should be in a size that covers all or part of a fingertip and may have any shape but preferably have a shape close to a circle. Furthermore, surfaces of the stickers 12 are given a predetermined color, preferably one color (e.g., yellow).

The marker information obtaining unit 14 obtains image information including information on images/locations of the stickers 12 from the digital imaging apparatus 10 and passes image data to the marker generating unit 16. In response to this, the marker generating unit 16 identifies and extracts image data on the stickers from among the received image data units and uses the extracted image data as markers 22. The markers 22 as used herein refers to a means of performing an action on a target (object) on a computer screen, and an alternative means for roles of usually a mouse and a pointer thereof (on a display screen) instead of them. The markers 22 each are treated as one object on software implemented on the computer 8.

It is desirable that the marker generating unit 16 generate distinct markers 22 whose shape and size are specified. A specific example of generating the markers 22 will be described later.

Markers 22 to be generated by the marker generating unit 16 are displayed on the display apparatus 4 of the computer 8 by the marker display unit 18. At this time, the marker display unit 18 causes the display apparatus 4 to display mirror images of imaged image data. As a result, the stickers 12 imaged by the DV camera 10, such as those shown in FIG. 2, become mirror images and are displayed as markers 22. Specifically, the sticker attached to the thumb in FIG. 2 (denoted by (A) in the drawing) is displayed as a left-side marker on the display screen and the sticker 12 attached to the index finger (denoted by (B) in the drawing) is displayed as a right-side marker on the display screen.

By the markers 22 acting on an object (a window 24 in FIG. 2) on the display screen shown in FIG. 2, the window (object) 24 on the display screen is operated. Namely, the operator can operate the window 24 by movement of his/her fingers or hand while looking at and checking the markers 22 on the display screen.

Figure 4:
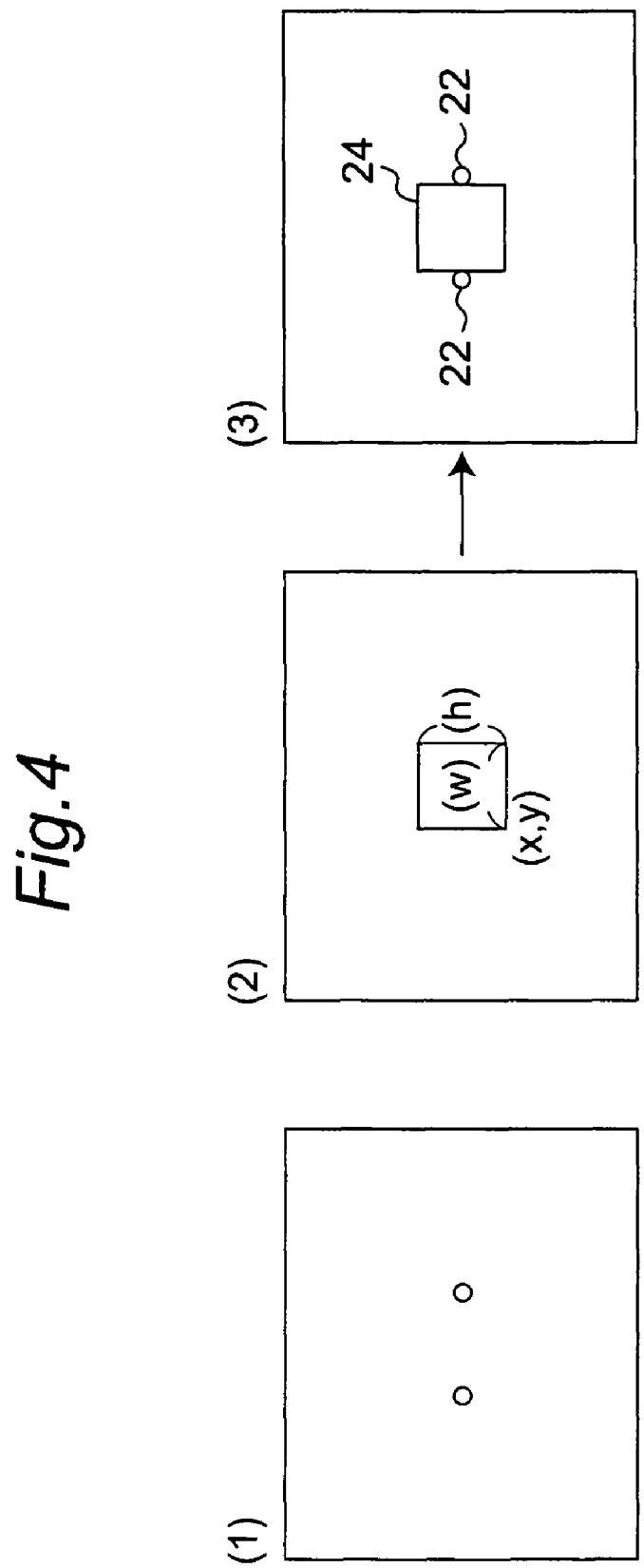
FIG. 4 is a diagram schematically showing a state in which images of markers which are mirror images (of FIG. 4(1)) are superimposed on a screen that displays a window (of FIG. 4(2)), whereby a screen that displays the markers and the window (object) is formed.

FIG. 4 schematically shows a state in which images of markers 22 which are mirror images (FIG. 4(1)) are superimposed on a screen that displays a window 24 (FIG. 4(2)), whereby a screen that displays the markers 22 and the window (object) 24 is formed.

Figure 5:
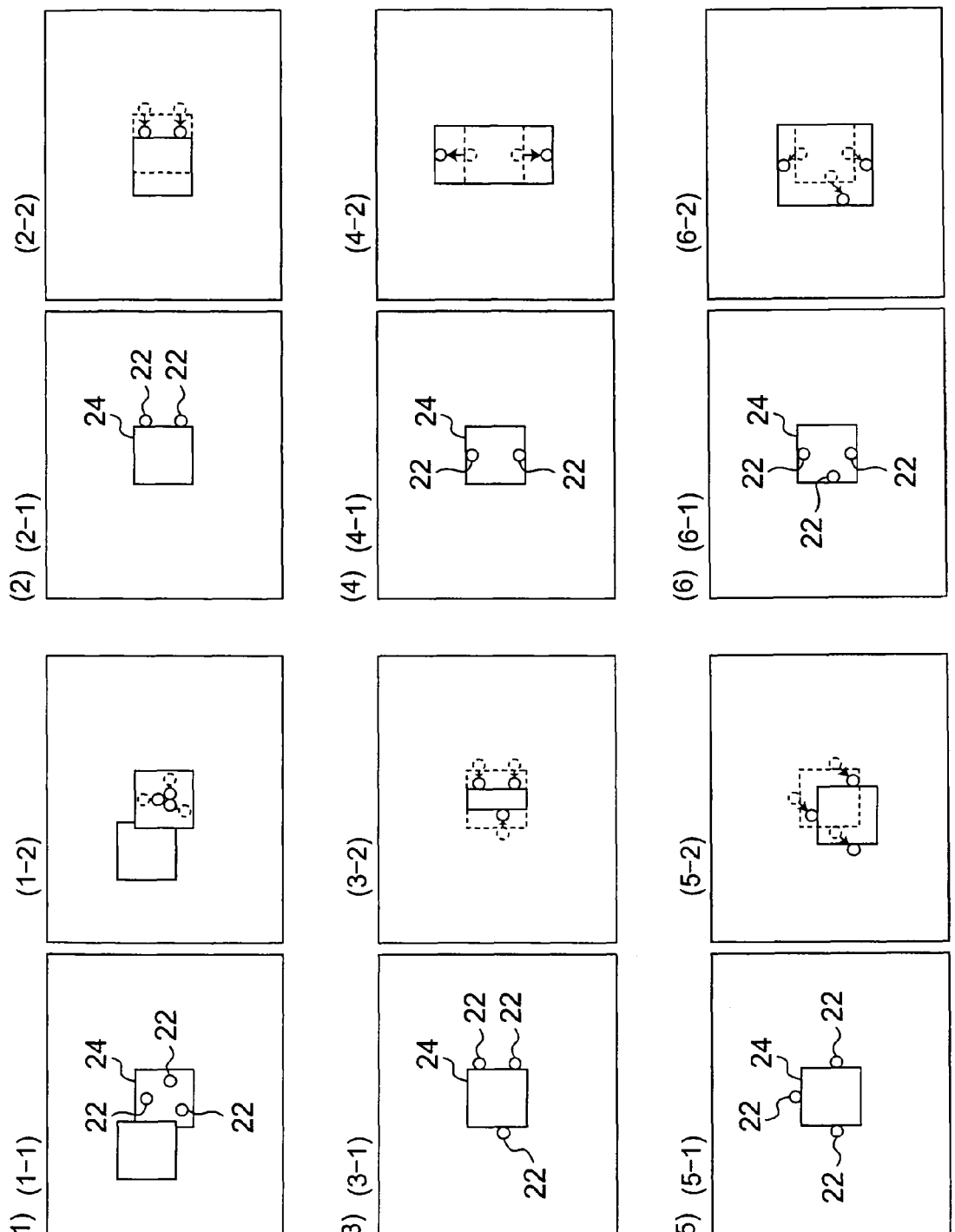
FIG. 5 is six diagrams showing a relationship between markers and a window(s)

A function of operating the window 24 by the markers 22 acting on the window (object) 24 is performed by the target object operating unit 20. For example, as shown in FIG. 5(2), when two markers 22 are present on the right side of a window 24 so as to be in contact with a right end side of the window 24, the target object operating unit 20 performs control to change the position and shape of the window 24 such that the entire window 24 including the right end side moves from right to left when the two markers 22 move to the left (i.e., the fingers of the operator having stickers attached thereto move to the left).

Next, the operation of the target object operating unit 20 will be described. In a computer program associated with the operation of the target object operating unit 20, (1) a marker,
    (2) a receiver,
    (3) a template, and
    (4) an operation are defined and used. In addition, FIG. 11 is a list showing notation of a marker, a receiver, a template, and an operation in the present specification. The notation is based on representation in the computer program.

A marker 22 is a means of performing an action on a target (object) on a computer screen and is an object that holds, as parameters, a shape (a), an area (s), a velocity vector (v), the center of gravity (g), etc. The marker 22 may include other parameters. A set of n markers is represented as $\{Mn\}$, for example, and an nth marker is represented as Mn. The area of an nth marker is represented as Mn→s and an x component of the velocity vector is represented as Mn→v.x. The velocity vector (v) is obtained, as will also be described later, from a difference in center of gravity coordinates between identical markers in an immediately preceding frame or several preceding frames and in a current frame.

In addition, upon displaying a marker 22 the marker generating unit 16, the marker display unit 18, and the display apparatus 4 may display a circle with a predetermined radius (e.g., a semi-transparent circle) with the center of gravity of the marker 22 being its center, instead of displaying an image of the marker 22 itself.

The receiver is an object serving as an action target on a computer screen. The present specification addresses a window 24 as a specific example. The window 24 is an object holding lower-left coordinates (x, y) and dimensions (w, h) (w is the width and h is the height) (see FIG. 4(2)). The receiver further holds a parameter (p) that records an action (operation) performed on the receiver in an immediately preceding frame. For example, when an action performed on the receiver in an immediately preceding frame is an action to push the receiver from the right, p is a constant such as p=kActionPushFromRight. The p can be a parameter that determines an operation to be issued, e.g. when there is a lot of noise (as described in detail later). For example, when there is a lot of noise, the p is used such that only when an immediately preceding p and a current p match each other, an operation indicated by the p is issued.

A set of n receivers is represented as $\{Rn\}$ and an nth marker is represented as Rn. On a display screen, Rn is always before Rn+1 (i.e., Rn is superimposed on Rn+1). The lower-left x coordinate of an nth receiver is represented as Rn→x.

The template is a template of an action performed on a computer screen, and particularly represents each single condition of an action such as pushing, grasping, or holding a receiver. A template holds an order d and a condition Q and is represented by Tn=(d, Q(r, m)). Here, the order (d) is a number representing how many sides of a receiver are associated with (see the following Table 1). For example, for an action to push one side from the outside, the order (d) is "1" (see FIG. 5(2)); for an action to pinch by the left and right sides, the order (d) is "2" (see FIG. 5(3)); for an action to hold the outside, the order (d) is "3" or "4" (see FIG. 5(5)); and for an action to hold the inside of the receiver, the order (d) is "0" (see FIG. 5(1)).

Q(Rk, {Mn}) is a function using one receiver Rk and a set of markers {Mn} as arguments. The function Q returns "True" when {Mn} represents a corresponding action on Rk and returns "False" when not representing.

A plurality of templates are provided and are represented as {Tn}. At compiling time, the order in {Tn} (priority order of application) is determined as the number of terms such that Tn→d≦Tn+1→d is always established. Table 1 shows the contents of templates. The order of n (the number of terms) of {Tn} gets higher from top to bottom of the table. In addition, the contents and the order of n (the number of terms) shown in Table 1 are merely an example where the templates are arranged such that operations move from simple ones to complex ones.

TABLE 1

| n | Template | Order | Content |
|---|---|---|---|
| 1 | Hold the inside | 0 | A plurality of markers come close to each other inside the receiver. |
| 2 | Push | 1 | A plurality of markers come close to one side of the receiver from the outside. |
| 3 | Pinch | 2 | One or more markers come close to the center from the outside of each of opposite sides. |
| 4 | Extend | 2-4 | One or more markers extend vertically relative to each of opposite sides from the inside of the opposite sides. |
| 5 | Hold the outside | 3-4 | One or more markers are present outside each of three or four sides and all markers move with substantially the same velocity vector. |
| 6 | Push and extend from the inside | 3-4 | One or more markers are present inside each of three or four sides and all markers move in a direction going away from the center. |

[End of Table 1]

The operation is an action performed on a computer screen. In the present invention, the operation particularly represents each single action such as pushing, grasping, or holding a receiver (see the following Table 2). One operation, e.g., a push operation has a push template and both of the operation and the template correspond to each other. The operations according to the present invention are functions in terms of programming and are represented as the sequence {On}. On=(O(r, m)). For example, On→O(Rp, {Mq}) indicates that a set of markers {Mq} causes an nth operation On and the operation On is applied to one receiver Rp.

TABLE 2

| Operation | Action | Correspondence with a drawing |
|---|---|---|
| Hold the inside | Bringing the receiver to the front. When the receiver is at the front, start a drag. | FIG. 5(1) |
| Push | Move the receiver in parallel to a coordinate axis. | FIG. 5(2) |
| Pinch | Reduce the width or height of the receiver. | FIG. 5(3) |
| Extend | Extend the width or height of the receiver. | FIG. 5(4) |
| Hold the outside | Move the receiver in parallel with an average velocity vector of markers. | FIG. 5(5) |

TABLE 2-continued

| Operation | Action | Correspondence with a drawing |
|---|---|---|
| Push and extend from the inside | Extend width and height in accordance with the movement of markers. | FIG. 5(6) |

[End of Table 2]

The operations are as follows:

First, as shown in FIG. 5(1), when a plurality of markers 22 by means of a plurality of stickers are brought close to one another inside a window 24, if the window 24 is not at the front of a display screen then the window 24 is brought to the front (see FIG. 5(1-2)), and if the window 24 is at the front of the display screen then the window 24 is dragged.

As shown in FIG. 5(2), by bringing a plurality of markers 22 by means of a plurality of stickers close to one side of a window 24 from the outside of the window 24, the window 24 moves in parallel to a coordinate axis of a display screen (see FIG. 5(2-2)).

As shown in FIG. 5(3), by bringing one or more markers 22 among a plurality of markers 22 by means of a plurality of stickers close to the center from the outside of each of a pair of opposite sides of a window 24, the window 24 is reduced in a direction intersecting the pair of opposite sides and toward the center (see FIG. 5(3-2)).

As shown in FIG. 5(4), by causing one or more markers 22 among a plurality of markers 22 by means of a plurality of stickers to extend from the inside of each of a pair of opposite sides of a window 24, so as to be in contact with each of the sides, the window 24 extends in a direction intersecting the pair of sides and going away from the center (see FIG. 5(4-2)).

As shown in FIG. 5(5), by causing one or more markers 22 among three or more markers 22 by means of three or more stickers to be present in contact with the outside of each of three or four sides of a window 24 and causing the markers 22 to move with the same velocity vector, the window 24 moves in parallel (see FIG. 5(5-2)).

Furthermore, as shown in FIG. 5(6), by causing one or more markers 22 among three or more markers 22 by means of three or more stickers to be present in contact with the inside of each of three or four sides of a window 24 and causing the markers 22 to move in a direction going away from the center, the width and height of the window 24 extend in accordance with the movement of the markers 22 (see FIG. 5(6-2)).

Now, an action performed on a side of a window by a marker will be described using FIG. 6. A case will be addressed in which a marker 22 acts on a side AB in FIG. 6(1) from the outside of a window. First, a rectangular region pqrs is set relative to the side AB. At this time, points p, q, r, and s are provided such that q and p internally divide the side AB at a predetermined ratio (e.g., 1:5:1) and qr and ps have a predetermined length (e.g., 5). Then, it is determined whether the center of gravity of the marker 22 is contained in the rectangular region pqrs. If the center of gravity of the marker 22 is contained in the rectangular region pqrs, then cos θ of the velocity vector of the marker 22 with respect to a ray orthogonal to the side AB from the center of gravity of the marker 22 is obtained and then θ is obtained from cos θ. When θ is in a predetermined range (e.g., between −40° and +40°), the marker 22 is considered to be acting on the side AB from the outside. At this time, the marker 22 may be considered to attempt to move the side AB by (only) a component of the velocity vector orthogonal to the side AB, i.e., orthogonal projection on the orthogonal vector, or may be considered to attempt to move the side AB by the velocity vector itself.

When the marker 22 acts on the side AB from the inside of the window, a rectangular region tuqp is set relative to the side AB and it is determined whether the center of gravity of the marker 22 is contained in the rectangular region tuqp. Furthermore, it is determined whether an angle θ between the velocity vector of the marker 22 and a ray orthogonal to the side AB from the center of gravity of the marker 22 is in a predetermined range. Similarly, for an action performed on each side, a rectangular region (S11, S12, S21, S22, S31, or S32) is set and it is determined whether the center of gravity of the marker 22 is contained in the region. In addition, when, as shown in FIG. 6(2), windows are close to each other, two rectangular regions are set using a median (vw in FIG. 6(2)) of close sides.

Next, a specific relationship among a marker, a receiver, a template, and an operation will be described.

As will be described later, after markers are identified, what action is to be performed on receivers by the markers is identified. At this time, a check of the receivers against templates is performed.

First, for a receiver $R_1$ in the forefront on a screen, it is checked for templates $T_1$ to $T_n$ whether the condition T∀p=[1, n]→Q($R_1$, {Mq})

returns True or False. When the number of terms of a template that is the first one for which False is returned is put as "k", as an operation, $O_{k-1}$→O($R_1$, {Mq})

is performed.

When also for both of the templates $T_1$ and $T_2$, the condition Tp=1and2→Q($R_1$, {Mq})

returns False, the target receiver is moved to $R_2$. That is, when the condition Q of the templates $T_1$ and $T_2$ which are simpler operations and are basic operations of templates $T_3$ and later returns False, it is considered that the markers do not act on $R_1$.

Subsequently, for the receiver $R_2$, it is checked whether the condition $T_1$→Q($R_2$, {Mq})

returns True or False; here, of the templates T, only a hold operation is a check target. In Table 1, only "hold the inside" ($T_1$) is a check target. This is because generally human actions are concentrated on something (object) in the forefront and thus actions such as "push", "pinch", "extend", and "push and extend from the inside" should be targeted only for $R_1$ (the receiver in the forefront). In the case of an operation to hold the inside, too, the operation is performed under the condition that markers associated with the operation are present in a visible region of the receiver $R_2$ (i.e., in a portion that is not hidden by other windows).

In addition, by the "hold" operation, the receiver $R_2$ is brought to the forefront. When the receiver $R_2$ is brought to the forefront, this object can be an operation target other than the "hold" operation in subsequent frames.

When for $R_2$ all of the conditions Q of the template of the "hold" operation are False, similarly and sequentially, for a receiver Rp (p≧3), too, it is checked whether $T_1$→Q(Rp, {Mq})

returns True or False; here, of the templates T, only a hold operation is a check target.

The target object operating unit 20 processes image data in a frame unit in the above-described manner. For subsequent frames, too, the same process is performed.

Figure 7:
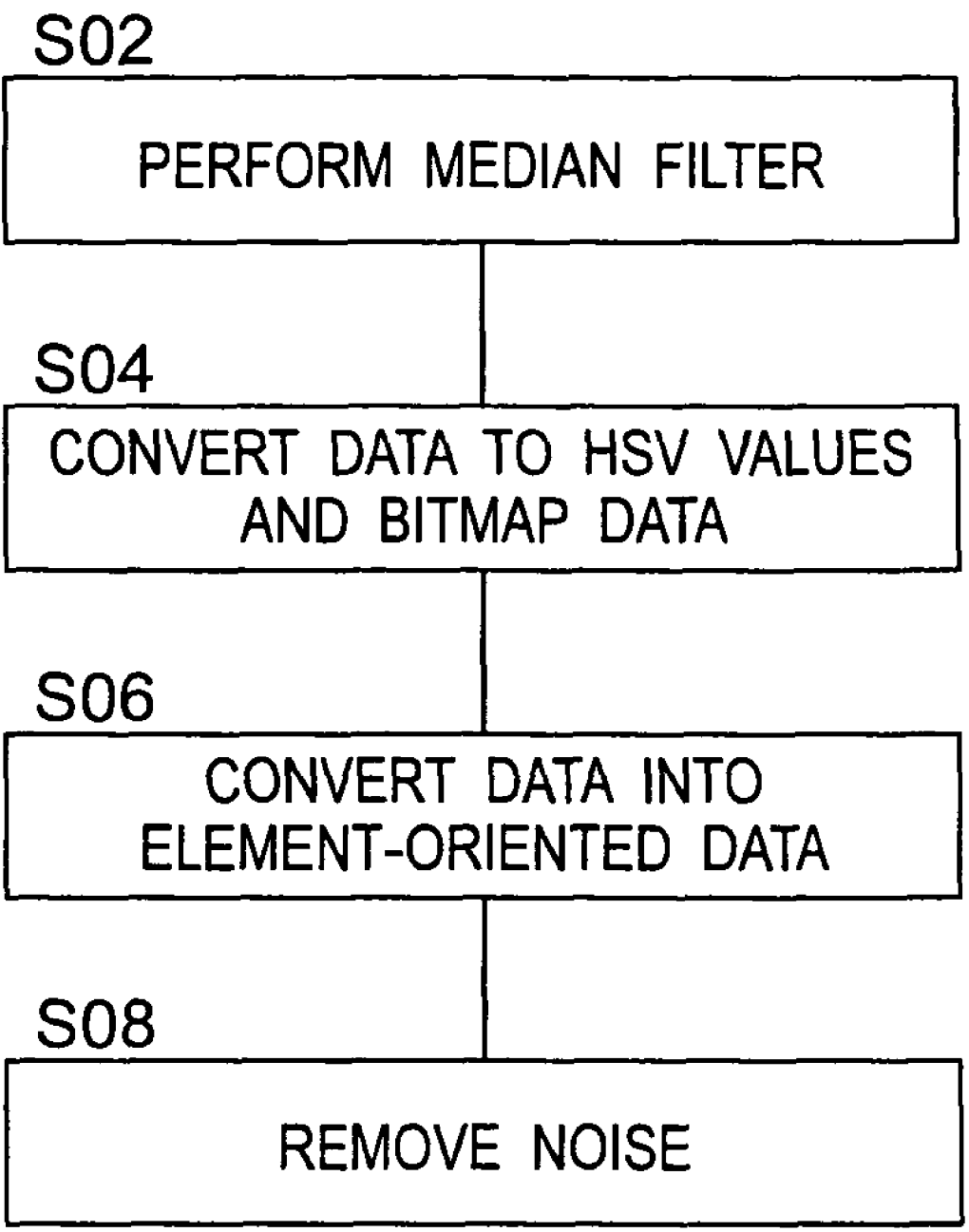
FIG. 7 is a flowchart of a process up to the point where markers are extracted from image data in a frame unit, performed by a marker generating unit of the apparatus for operating objects according to the present invention.

FIG. 7 is a flowchart showing a process up to the point where markers are extracted from image data in a frame unit, performed by the marker generating unit 16 of the apparatus 2 for operating objects. FIG. 8 is a detailed flowchart of a "noise removal" step (S08) in the flowchart shown in FIG. 7. Using FIGS. 7 and 8, a marker extraction process by the marker generating unit 16 will be described.

First, median filter is performed on image data in a frame unit (step S02). The median filter may be one used in the conventional art. In addition, this step S02 may be omitted.

Then, the image data is bitmapped (step S04). At step S04, first, the image data is converted in a pixel unit from RGB values to HSV values to obtain H (Hue), S (Saturation), and V (Value) values. Predetermined HSV values ($H_0$, $S_0$, $V_0$) of a preset marker color (e.g., yellow) are compared with the HSV values of individual pixels (x, y) for each of H, S, and V and only those pixels whose respective HSV differences are less than or equal to their respective threshold values are extracted as marker candidate portions and a bitmap is generated.

Subsequently, the marker candidate bitmap data is converted into element-oriented data (step S06). The element orientation will be described later.

Finally, noise is removed (step S08). By removing noise, a marker is made distinct and the velocity of the marker is grasped. A detail of the noise removal process will be described later.

The element orientation refers to an algorithm that represents an n-dimensional arcwise connected solid by individual (n−1)-dimensional solids being in contact with each other, and an idea behind the algorithm, and is an idea devised by the present inventors. The present specification uses an idea of the element orientation that a two-dimensional arcwise connected plane figure is represented by individual segments being in contact with each other. This element orientation can be used, for example, when three-dimensional organ models are formed from a CT scan image of the human body which is composed of numbers of parallel plane images or when a three-dimensional modeling tool for computer graphics is constructed.

In addition, although the present specification uses C language as a programming language notation, other languages may be used. FIG. 12 is a list showing element orientation notation in the present specification. This notation is based on representation in a computer program.

First, a bitmap is prepared. In the bitmap, a value at an arbitrary point (pixel) (x, y) is either True or False (i.e., either on "1" or off "0"). A bitmap value at (x, y) is represented by B(x, y).

Then, from the value of B(x, y), a segment element is initialized. As shown in the following program (Table 3), B(x, y) is continuously observed. First, y (vertical axis) is fixed and then x (horizontal axis) is continuously increased. Given that a point where B (x, y)=True is distributed from ($x_0$, y) to ($x_1$, y), a segment is established therein. With the segment used as a segment element, coordinates ($x_0$, y) indicating a starting point and a value of horizontal width $x_1-x_0$=w are held as (x, y, w)=($x_0$, y, $x_1-x_0$). Here, assuming that there are a plurality of segment elements, the segment elements are represented as the sequence {Ln} and the starting point coordinates and width of each segment element are respectively represented by Ln→x and Ln→w. For example, in FIG. 9(2), $L_1$ to $L_5$ are shown.

TABLE 3

```
int x,y;
for (y=0 ; y< (Height) ;y++)
{
    for (x=0 ; x< (Width) ; x++)
    {
        BOOL b = B(x,y);
    }
}
[End of Table 3]
```

An undirected topological graph G:={g, {Ln}, E} where {Ln} are all vertices is considered. Further, if La and Lb are algebraic geometrically in contact with each other, then it is considered that there is a side between La and Lb. A determination as to contact is made as follows:

TABLE 4 int D = (La→(x+w) − Lb→x) × (La→x − Lb→(x+w) )
[End of Table 4]

(Determination criterion): When the absolute value of a difference of La→y and Lb→y is one, if D in the above equation is positive then they are not in contact with each other; if D is zero then they are in contact with each other by a point; and if D is negative then they are contact with each other by a segment. When the difference of La→y and Lb→y is zero, if D in the above equation is zero then they are in contact with each other. And otherwise, they are not in contact with each other.

According to the above, the presence/absence of a contact relationship between segment elements is sorted out (i.e., a side is set according to the above, if necessary). In a created graph G, a set of arcwise connected subgraphs {G'} is a set of matter elements and a G'→{Ln} element which is one item of {G'} is a matter element. By this, individual matter elements represent one arcwise connected shape (see FIG. 9(2)).

Adapting various algorithms to a matter element makes various numerical values to be easily represented. The following shows an area, center of gravity coordinates, and a deformation rate from a precise circle. In addition, the following An is one matter element.

The area is represented by the following equation:

$$S = \sum_{k=1}^{P} An \to L_k \to w \quad \text{[Equation 1]}$$

where p is the number of segment elements composing An. The above equation merely shows that by summing segment elements an area is obtained.

The center of gravity coordinates is represented by the following equation:

$$(gx, gy) = \frac{\sum_{k=1}^{P} An \to L_k \to \left(\left(x + \frac{w}{2}\right) \times w, y \times w\right)}{S} \quad \text{[Equation 2]}$$

The deformation rate from a precise circle is represented by the following equation:

$$x' = \min(An \to L_p \to x) \quad \text{[Equation 3]}$$
$$y' = \min(An \to L_p \to y)$$
$$w' = \max(An \to L_p \to (x+w)) - x'$$
$$h' = \max(An \to L_p \to y) - y'$$
$$c = \left|1 - \frac{4S}{w' \times h' \times \pi}\right|$$

FIG. 9 is a conceptual diagram showing the contrast between a conventional-art labeling process and the element orientation. FIG. 9(1) is a diagram showing representation of graphics by the labeling process and FIG. 9(2) is a diagram showing representation of graphics by element-oriented data according to the present invention. As is clear from the drawings, the amount of data is significantly reduced with the element orientation over the labeling process.

FIG. 8 is a detailed flowchart of a noise removal step. The noise removal step will be described using an example of matter elements on a screen shown in FIG. 10. The examples of matter elements shown in FIG. 10 include three yellow markers, a yellow writing instrument, a yellow doll, and a curtain with a yellow pattern.

Figure 10:
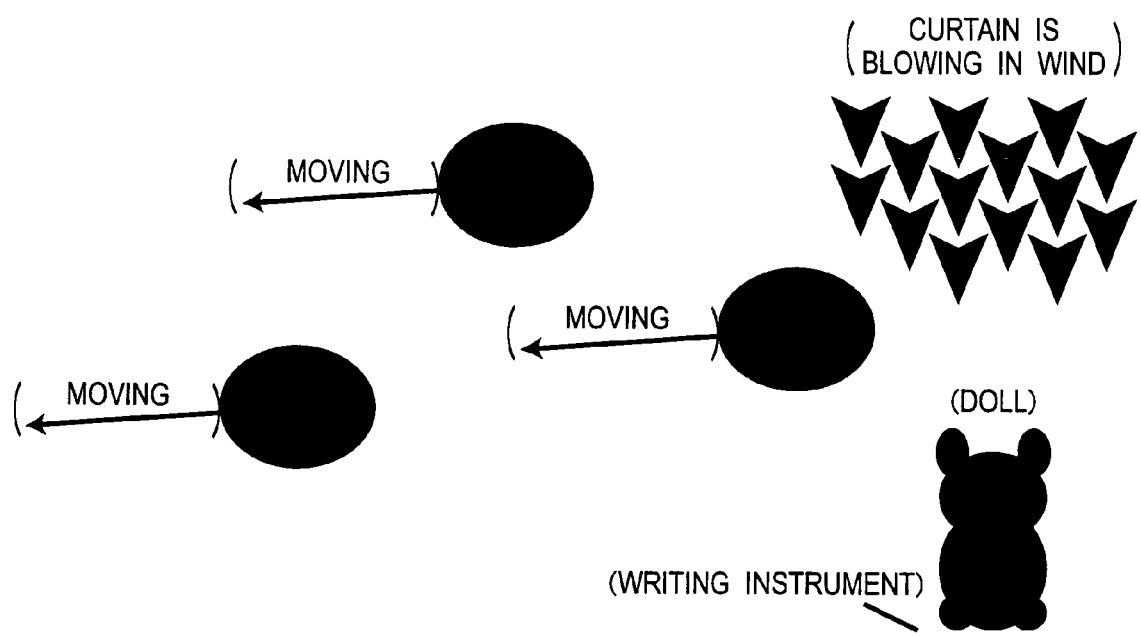
FIG. 10 is a diagram showing an example of matter elements on a screen.

First, a matter element whose area Mn→s has a very large value or a very small value is removed (S0802). For example, a matter element of one pixel or a matter element that occupies substantially half of the screen is removed. In the example of FIG. 10, the writing instrument can be removed.

Then, a matter element with a low precise circle rate is removed (S0804). The precise circle rate of a matter element is represented by the second term of the right-hand side of the fifth equation in the above [Equation 3]. Specifically, the closer the shape of the matter element is to a circle, the closer the precise circle rate is to one, and thus, the deformation rate c [the deformation rate M(n(c)) of the matter element] is reduced. Hence, a matter element whose deformation rate M(n(c)) is greater than a predetermined value is removed. This removal eliminates, for example, a matter element in a very unusual shape or a matter element representing sandstorm-like noise. The doll shown in FIG. 10 is removed in this step. Even if the writing instrument shown in FIG. 10 is not removed at step S0802, it is removed in this step.

Subsequently, beaded noise is removed (S0806). The beaded noise is noise, such as the curtain with a pattern shown in FIG. 10, where a plurality of moving matter elements are locally gathered and the matter elements have a relatively equal area. The beaded noise is removed as follows.

It is assumed that a function F(x, d) (x is a matter element and d is a positive number) is a function that returns a set of other matter elements present within a distance d from a certain matter element x (the distance between two matter elements, however, is the distance between the centers of gravity of the two matter elements). Also, it is assumed that a function G(x, d) (x is a matter element and d is a positive number) is a function that performs {y}=F(x, d) on a certain matter element x and further performs, if a set of return values is not an empty set, {z}=F(y, d) on all elements y in the set and performs again F(z, d) on elements z in the set of return values and recursively repeats such an operation until an empty set is returned. Then, at the point in time when an empty set is returned, the function puts all matter elements included in return values obtained up to this point, in a set and returns the set.

Furthermore, a function H(x, d) (x is a matter element and d is a positive number) is a function that returns the number of elements in a set of return values of the function G(x, d).

$$H'(x, d) = \Delta H(x, d)/\Delta d \quad \text{[Equation 4]}$$
$$H'(x, d) = \frac{\Delta H(x, d)}{\Delta d} = \frac{H(x, d + \Delta d) - H(x, d)}{\Delta d}$$

When a function H' (x, d) is defined as shown in the above equation, if the value of H' (x, d) exceeds a predetermined threshold value, then it is highly possible that noise is included in G(x, d) Hence, a deviation value for an area for all matter elements of G(x, d) is obtained and a matter element whose deviation value is close to 50 is determined to be noise and thus is removed.

The determination and removal by the functions F, G, H, and H' may be performed, for example, for each of 9 (=3×3) divided screens.

Matter elements remaining at this point in time can be considered to be markers. As previously described, since for markers the center of gravity and velocity (vector) are important, the center of gravity of a marker is obtained according to the equation in the above [Equation 2] and furthermore a velocity vector is obtained. First, at this point in time, each matter element on a current frame is contrasted with each matter element on an immediately preceding frame and identical matter elements are connected (S0808). Upon connecting identical matter elements between two adjacent frames, two matter elements whose center of gravity coordinates are the same or whose difference of center of gravity coordinate is less than or equal to a predetermined value may be considered to be identical matter elements. Further, for a process for a subsequent frame, frame data for the current frame including matter elements obtained at this point in time is recorded.

Then, the velocity vector of a matter element Mn→v is calculated (S0810). The velocity vector Mn→v is obtained from a difference in center of gravity coordinates between identical matter elements in an immediately preceding frame or several preceding frames and in a current frame. As also previously described, upon displaying a marker, a circle with a predetermined radius (e.g., a semi-transparent circle) with the center of gravity of the marker being its center may be displayed instead of displaying an imaged image of the marker itself. In addition, an arrow representing a velocity vector that changes as needed may be displayed so as to extend from the center of gravity of the marker.

By the above-described steps S02 to S08 and steps S0802 to S0810, markers for each frame are generated.

[Variant 1]

Figure 13:
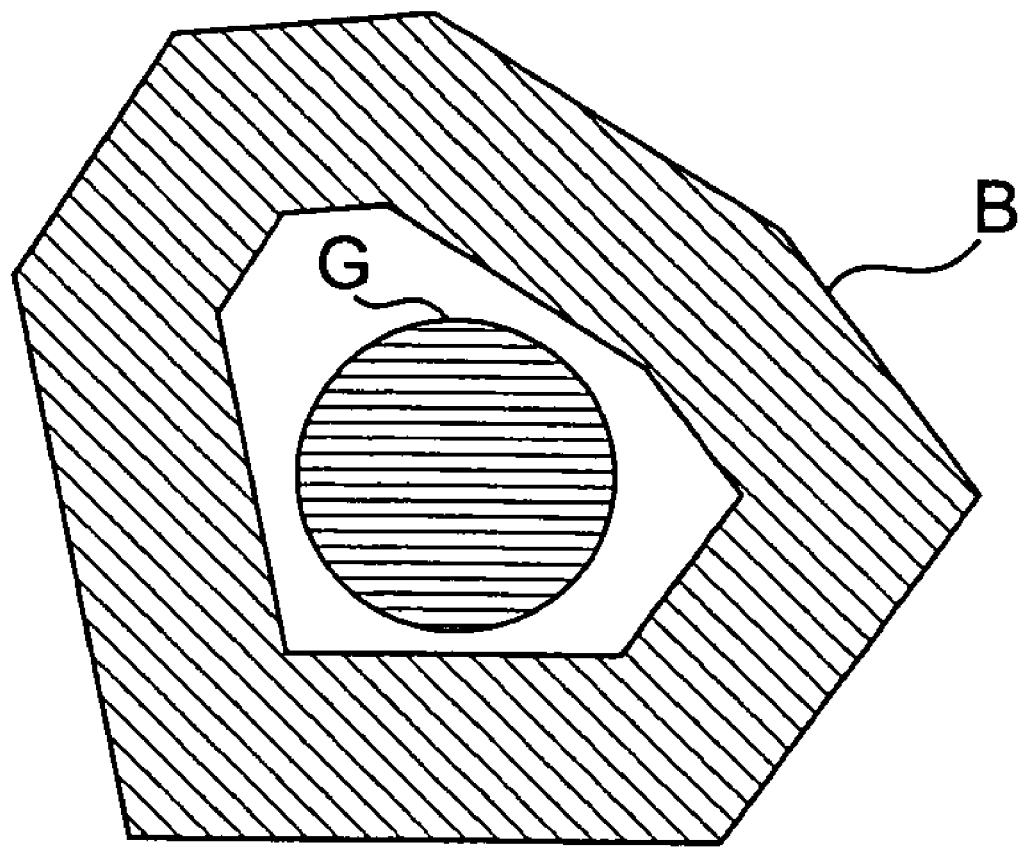
FIG. 13 is a diagram showing an example of two matter elements.

Although in the above description of noise removal a noise removal step is specifically shown using the flowchart shown in FIG. 8, the noise removal step is not limited to that described above. As shown in FIG. 13, a situation where a matter element is present in another cycle-like matter element is considered. In addition, though not shown in FIG. 13, it is assumed that the matter element inside is a "green" matter element G (Green Area) and the cycle-like matter element present at an outer edge thereof is a "blue" matter element B (Blue Area).

When a certain matter element is thus present in a cycle of another matter element, the cycle-like matter element is considered to be noise.

In the following (Table 5), a step of determining whether the matter element G is present in the cycle of another matter element B will be described. The determination process may be performed anywhere between the steps included in the flowchart of FIG. 8 or may be performed after step S0810.

TABLE 5

```
BOOL GreenAreaIsInsideBlueArea(AreaElement G, AreaElement
B)
{
    int i,j;
    for (i=0 ; i< Numbers of segment elements of G ; i++)
    {
        int l[Sufficiently large integer];
        BOOL inside = NO;
        int x = G(i(x));          //x coordinate of a
starting point of an ith segment element of G
        int y = G(i(y));          //y coordinate of the
starting point of the ith segment element of G
        int w = G(i(w));          // Width of the ith
segment element of G
        int c = 0;                // Number of segment elements
whose y coordinates match
        for (j=0 ; Number of segment elements for j<B ; j++)
        {
            if (y == B(j(y)))     //If there are those whose
y coordinates match
            {
                l[c] = j;
                c = c+1;          //One is added to the
number since there is a match
            }
        }
        if (c > 1)
        {
            BOOL left_exists = NO;BOOL right_exists = NO;
            //Whether there is a segment element of B in the left and
right of a segment element of G
            int k;
            for (k=0 ; k<c ; k++)        /Loop for those
having the same y coordinate
            {
                LineElement L = B(l[c]);
                if (x + w < L(x))
                {
                    right_exists = YES;
                } else if (L(x) + L(w) < x) {
                    left_exists = YES;
                }
            }
            if (left_exists)
            {
                if (right_exists)
                {
                    inside = YES;
                } else {
                    inside = NO;
                }
            } else {
                inside = NO;
            }
        } else {
            inside = NO;
        }
        if (inside == NO)
        {
            return NO;       //If there is a segment whose left and
right both are not surrounded, then immediately break out of the
function and return NO.
        }
    }
    return YES;       // Since inside has never been NO, the left and
right of all segment elements are surrounded and thus the left and
right of the matter element are also surrounded. Hence, G is in B.
}
[End of Table 5]
```

A certain matter element being in a cycle of another matter element is mathematically expressed as follows:

[Equation 5]

Specifically, when there are a finite sequence {Sn}, a natural number t, and a natural number u that satisfy all of the above three equations and t≠u, Aq is inside Ap.

In addition, the step of determining whether the matter element G is present in the cycle of another matter element B, shown in the above Table 5, is related to two-dimensional matter elements G and B. Since the element orientation is an idea that an n-dimensional (n≧3) matter element can be targeted, the idea of the element orientation can also be used in determining whether a certain n-dimensional matter element is present in a cycle of another n-dimensional matter element or not. In a determination as to a cycle relationship of an n-dimensional (n≧3) matter element, however, there are more points to be considered over a determination as to a cycle of a two-dimensional matter element (see Table 5).

As such, it can be said that the element orientation is an idea that is suitable to represent not only algebraic geometrical discontinuity of a matter but also topological characteristics of the matter.

[Second Variant]

Although in the description of the marker generating unit an example of marker generation is described, markers and stickers are not limited to those described above. For example, a red sticker may be attached to a thumb and yellow stickers may be attached to all fingers other than the thumb and markers which are mirror images of the stickers on the fingers other than the thumb may have the same function as the markers described in the description of the "target object operating unit" and (display of) a marker which is a mirror image of the (red) sticker on the thumb may have a mouse click function.

Specifically, with the thumb being bent so that the red sticker on the thumb is not shot by a DV camera, a window 24 is operated by other four fingers and in mid-course the thumb is unbent so that the red sticker on the thumb is shot by the DV camera (i.e., a marker which is a mirror image of the red sticker is suddenly displayed), whereby a click action takes place.

Alternatively, a red sticker may be attached to a thumb of a left hand and yellow stickers may be attached to five fingers of a right hand and markers which are mirror images of the stickers on the fingers of the right hand may have the same function as the markers described in the description of the "target object operating unit" and display of a marker which is a mirror image of the (red) sticker on the thumb of the left hand may have a mouse click function.

Alternatively, a sticker may be attached to an end of a short stick-like material such as a straw and an operator may put the straw in his/her mouth and the sticker and a marker may be moved by the mouth.

A touch screen may be an input source (marker information obtaining unit 14) of a marker. Specifically, a screen also serves as a touch screen and a contact region brought about by contact with a pressure made onto the screen may serve as a marker.

What is claimed is:

1. An apparatus for operating objects that operates an object on a screen based on an imaged operating element, the apparatus comprising:
    a computing apparatus;
    a display apparatus connected to the computing apparatus; and
    an imaging apparatus connected to the computing apparatus, wherein
    the imaging apparatus images a predetermined operating element and the computing apparatus displays, as a marker, an image of the imaged operating element on the display apparatus, and
    the object on the screen of the display apparatus is operated by movement of the marker, and wherein
    the computing apparatus generates a bitmap B(x, y) in a pixel unit from digital image frame data imaged by the imaging apparatus, focusing on image properties including a predetermined H (Hue), S (Saturation), and V (Value),
    represents presence of a bit at each y value in the bitmap B(x, y) by a segment element (x, y, w) having a starting point (x) and a width (w),
    determines whether there is a contact relationship between the segment elements and puts together segment elements having a contact relationship into a matter element, and
    generates the marker based on the matter element.

2. The apparatus for operating objects according to claim 1, wherein the computing apparatus displays, as a marker, a mirror image of the image of the operating element on the display apparatus.

3. The apparatus for operating objects according to claim 2, wherein the imaging apparatus images a plurality of operating elements, and markers respectively corresponding to the plurality of operating elements are caused to act on the object, whereby the object is operated.

4. The apparatus for operating objects according to claim 3, wherein
    the object is a window, and
    when the plurality of markers by the plurality of operating elements are brought close to each other inside the window,
    if the window is not at front of a display screen then the window is brought to the front, and if the window is at the front of the display screen then the window is dragged.

5. The apparatus for operating objects according to claim 3, wherein
    the object is a window, and
    when the plurality of markers by the plurality of operating elements are brought close to one side of the window from an outside of the window,
    the window moves in parallel to a coordinate axis of a display screen.

6. The apparatus for operating objects according to claim 3, wherein
    the object is a window, and
    when, among the plurality of markers by the plurality of operating elements, one or more markers are brought close to a center from an outside of each of a pair of opposite sides of the window,
    the window is reduced in a direction intersecting the pair of opposite sides and toward the center.

7. The apparatus for operating objects according to claim 3, wherein
    the object is a window, and
    when, among the plurality of markers by the plurality of operating elements, one or more markers are caused to extend from an inside of each of a pair of opposite sides of the window, so as to be in contact with each of the sides,
    the window extends in a direction intersecting the pair of sides and going away from a center.

8. The apparatus for operating objects according to claim 3, wherein
the object is a window, and
when, among three or more of the markers by three or more of the operating elements, one or more markers are caused to be present in contact with an outside of each of three or four sides of the window and the markers are caused to move with a same velocity vector,
the window moves in parallel.

9. The apparatus for operating objects according to claim 3, wherein
the object is a window, and
when, among three or more of the markers by three or more of the operating elements, one or more markers are caused to be present in contact with an inside of each of three or four sides of the window and the markers are caused to move in a direction going away from a center,
a width and a height of the window extend in accordance with movement of the markers.

10. The apparatus for operating objects according to claim 3, wherein
in the computing apparatus, a relationship between the markers and the object is defined in advance for each action content, and furthermore, the plurality of action contents are ordered in advance from basic to complex actions, and
in frame data processing performed by the computing apparatus, it is checked along the order whether the markers and the object satisfy the relationships defined in advance or not, and when a number of terms in the ordering obtained as it is recognized that they do not satisfy the relationships is put as "k", an action content corresponding to a (k−1)th one in the ordering is an action performed on the object by the markers.

11. The apparatus for operating objects according to claim 10, wherein
in the frame data processing performed by the computing apparatus, a plurality of objects on the screen of the display apparatus are ordered from front to back of the screen, and
which object an action of the markers targets for is checked along the ordering.

12. The apparatus for operating objects according to claim 11, wherein a number of types of action performed on an object other than an object in forefront on the screen of the display apparatus is less than a number of types of action performed on the object in the forefront on the screen of the display apparatus.

* * * * *